Figure 1:
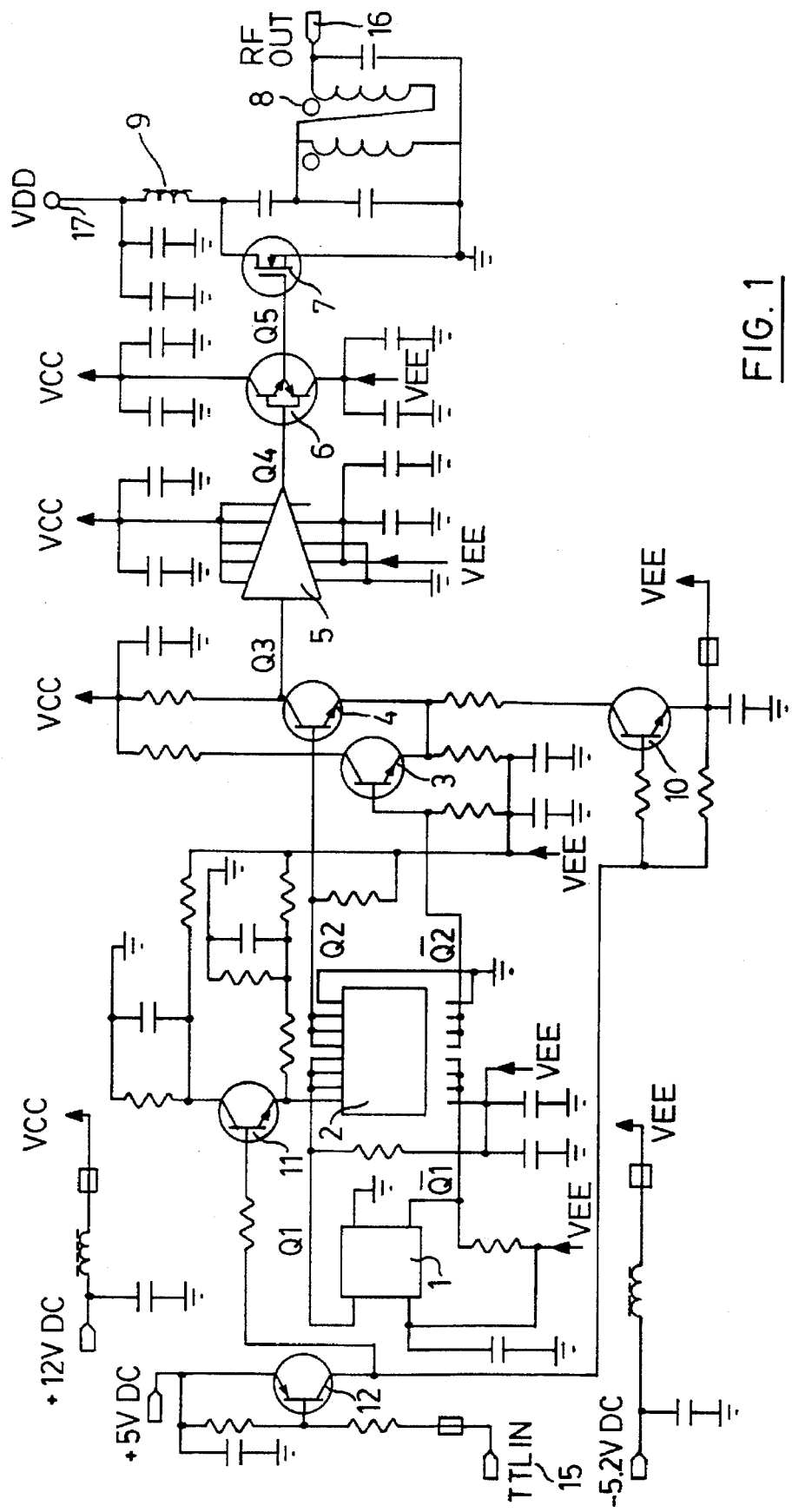

United States Patent [19]
Crane et al.

[11] Patent Number: 5,640,129
[45] Date of Patent: Jun. 17, 1997

[54] SWITCHING RF GENERATOR AND MODULATOR

[76] Inventors: R. Anthony Crane, 755, York Mills Rd. Apt.1401, Don Mills, Ont M3B 1X5, Canada; Victor Kuczynski, 2061, Bridletown Cir. Unit 67, Scarborough, Ontario, Canada, M1W 2J7

[21] Appl. No.: 261,501

[22] Filed: Jun. 15, 1994

(Under 37 CFR 1.47)

[30] Foreign Application Priority Data

Aug. 20, 1993 [CA] Canada .................. 2098636

[51] Int. Cl.⁶ .................. H03B 1/00; H04B 1/02
[52] U.S. Cl. .................. 331/75; 331/173; 331/177 R
[58] Field of Search .................. 331/74, 75, 173, 331/177 R; 332/149, 178

[56] References Cited

U.S. PATENT DOCUMENTS 3,250,923  5/1966  Liska et al. .................. 331/75
3,891,811  6/1975  Miller .................. 324/66

Primary Examiner—Siegfried H. Grimm

[57] ABSTRACT

An electrical signal generator for generating an output signal of predetermined frequency has an oscillator of predetermined frequency operable to produce a first signal of said frequency, which is fed to an amplifier which amplifies the power level of the first signal to produce a first higher power signal. A switch/controller circuit both switches on and off the feed of the first signal from the oscillator to the amplifier and controls the amplifier. The first higher power signal is fed to an output. The oscillator may produce a first signal and an inverted first signal, with the amplifier amplifying the first signal and the inverted first signal, and with both the first higher power signal and the inverted first higher power signal being fed to the output.

7 Claims, 5 Drawing Sheets

SWITCHING RF GENERATOR AND MODULATOR

This invention relates to electrical signal generators for generating an output signal of predetermined frequency, for example a wideband radio frequency (RF) signal.

It is common practice for RF generators to use single frequency crystal oscillators and highly selective (narrow band) amplification stages in order to obtain the desired output signal level. Such known oscillators are limited so far as operational frequency changes are concerned by the narrow frequency response of the amplification stages. Such generators are therefore inconvenient to use because a significant frequency change requires changing the frequency response of the amplification stages. There is another commonly used method for generating RF signals which involves providing tunable or synthesized oscillators with subsequent wideband amplification stages. However, the circuits of such generators are somewhat complex.

It is therefore an object of the present invention to provide an electrical signal generator which at least substantially overcomes such problems and enable the predetermined frequency to be readily varied.

The present invention is based on the realization that such problems can be at least substantially overcome by utilizing an oscillator such as a digital clock with following switching circuit gages and wideband transformers for impedance matching. Such switching circuitry is not unduly frequency dependent on its operational range and can provide at least tens of watts of RF power with a DC (VDD) voltage as low as ten volts. A digital clock can provide a frequency range from the audio to the microwave regions. Discrete changes in operational frequency can be achieved by replacing a fixed frequency digital clock with another digital clock of the desired frequency or by adjusting the frequency of a variable frequency digital clock.

The invention can be utilised to provide an electrical signal generator which is a wideband (broad band) switching RF generator and modulator and which can provide a wide range of RF output power from milliwatts to kilowatts. The invention therefore enables an RF signal source to be provided which has a wide power range, a wide frequency range and/or having amplitude, frequency, phase or pulse modulation.

According to the present invention therefore, an electrical signal generator for generating an output signal of predetermined frequency comprises an oscillator of predetermined frequency operable to produce a first signal of said frequency, means for receiving and amplifying the power level of said first signal to produce a first higher power signal, means for both switching on and off the feed of said first signal from the oscillator to the amplifying means and controlling the amplifying means, and means for feeding said first higher power signal to an output.

The oscillator may produce a first signal and an inverted first signal, with the amplifying means receiving and amplifying the first signal and the inverted first signal, and the feed means feeding both the first higher power signal and the inverted first higher power signal to the output.

The oscillator may comprise a digital clock which may have a fixed frequency or may have a voltage controlled adjustable frequency.

The feed means may comprise a buffer which receives the higher power first signal from the amplifying means and provides an output signal of lower impedance, means to delay signal crossover to reduce likelihood of crossover distortion and/or a voltage-controllable power adjuster.

Figure 2:
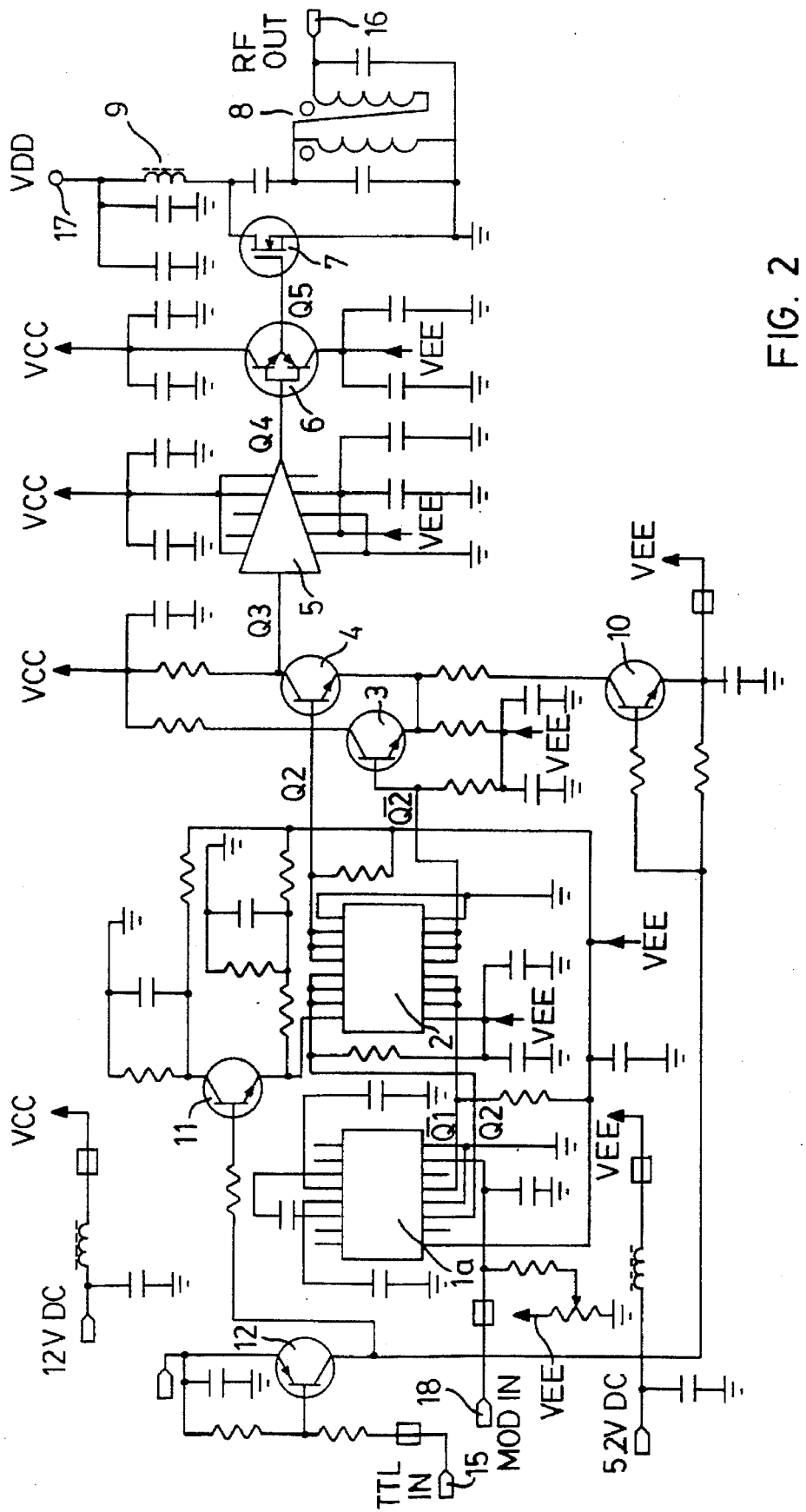
Figure 3:
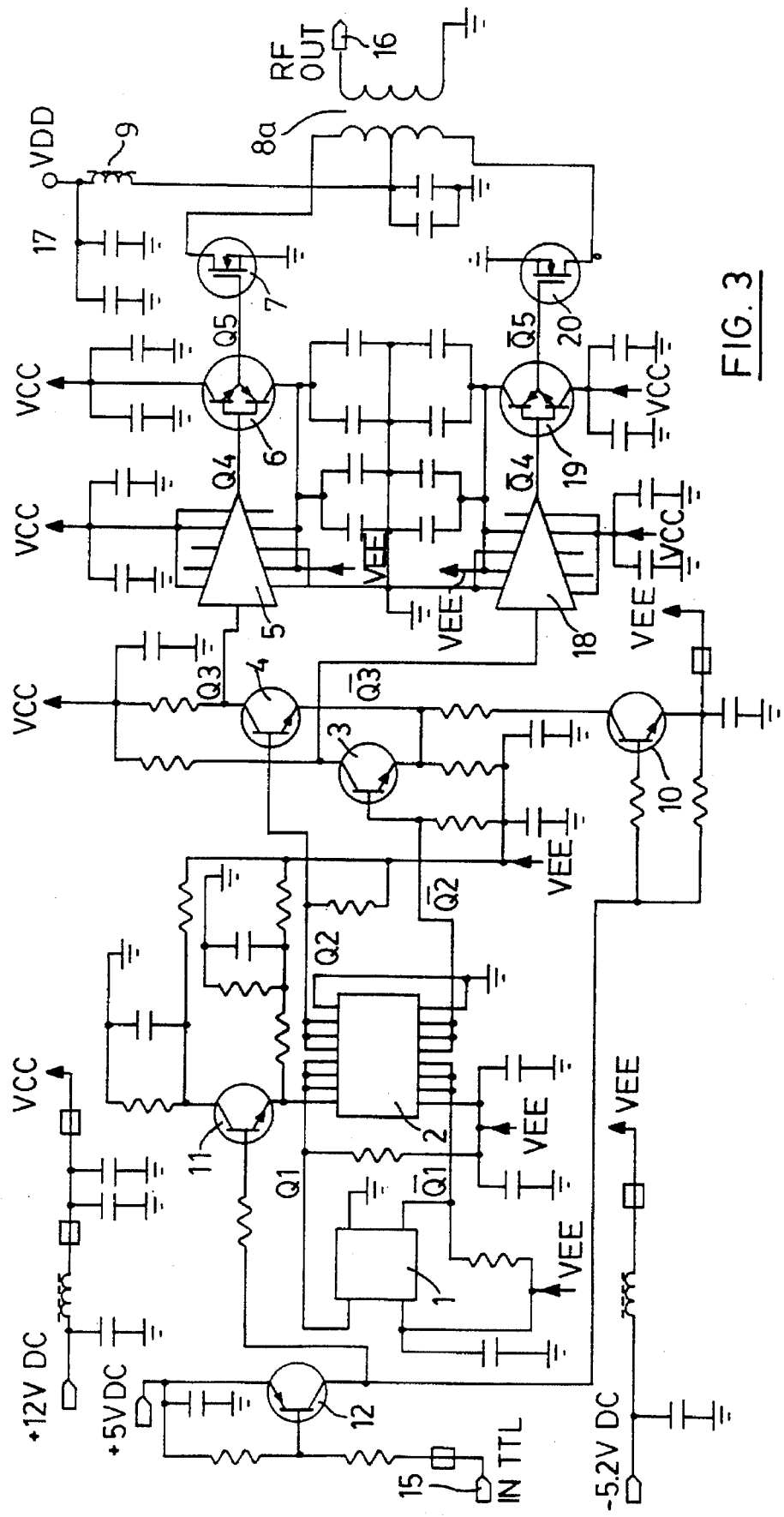
Figure 4:
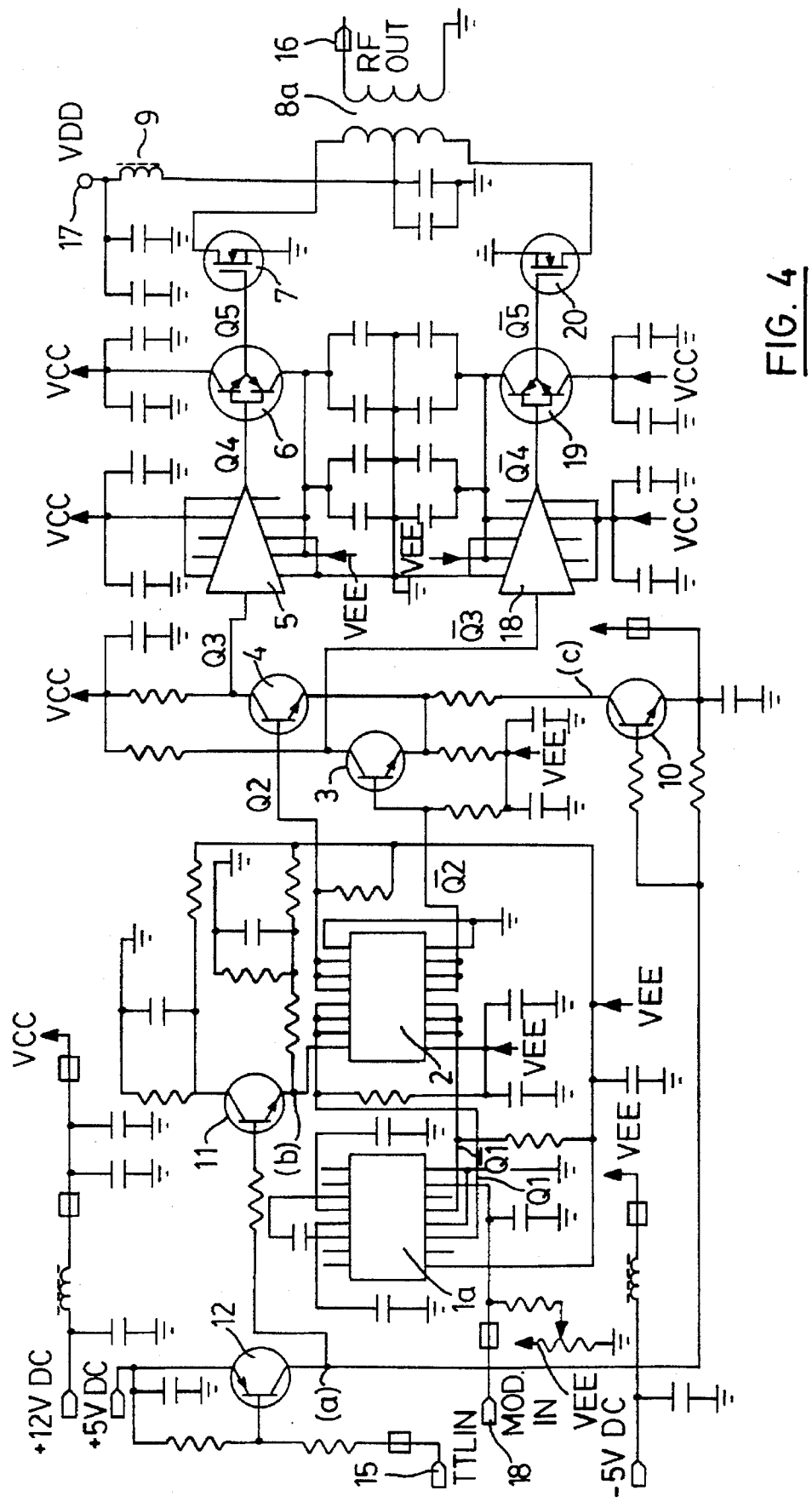
Figure 5:
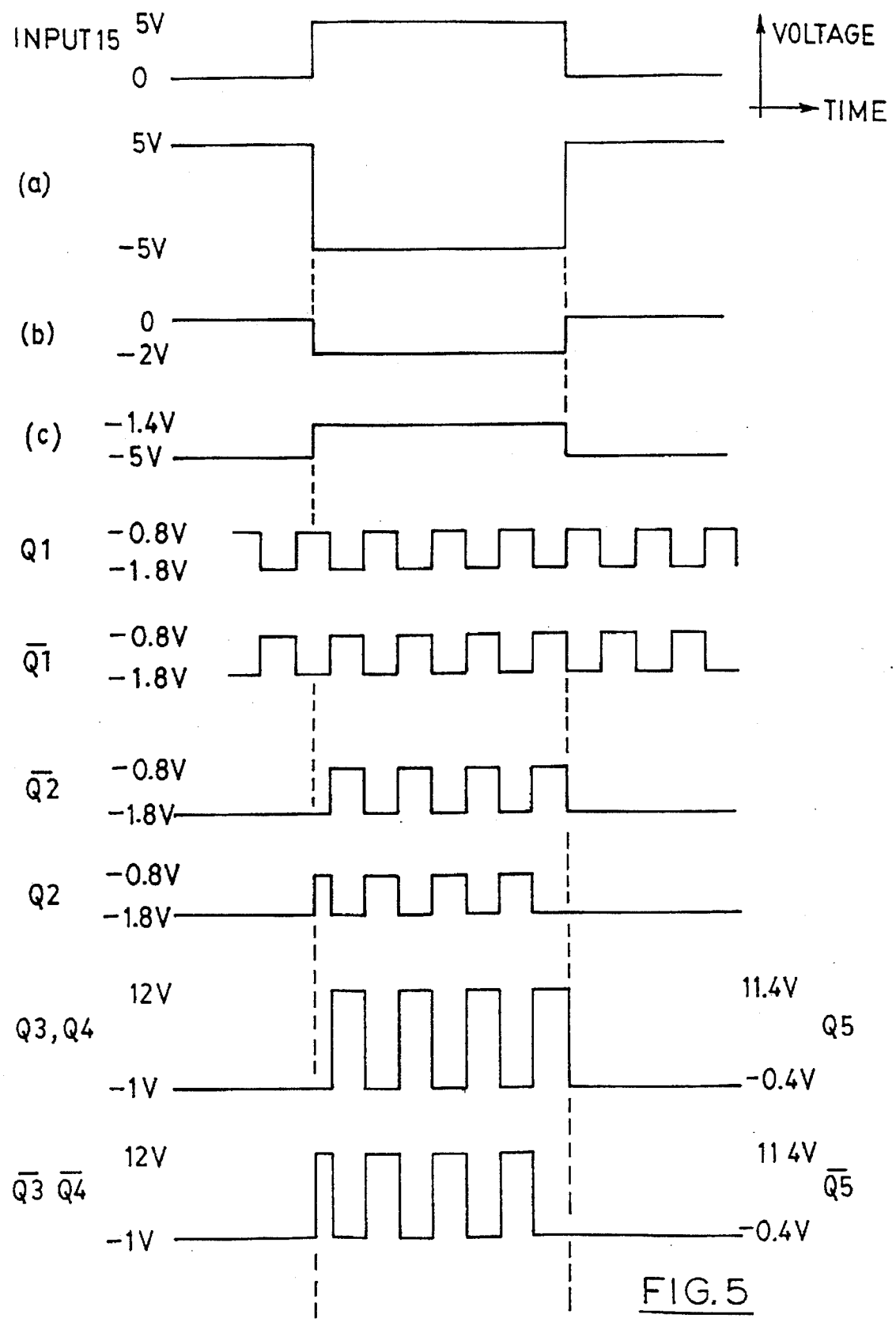

Embodiments of the invention will now be described, by way of example, with reference to the accompanying drawings, of which:

FIG. 1 is an electrical circuit diagram of an electric signal generator in accordance with one embodiment of the invention having a fixed frequency oscillator and a single output, FIG. 2 is a similar view of a signal generator in accordance with a second embodiment with a variable frequency oscillator and a single output, FIG. 3 is a similar view of a signal generator in accordance with a third embodiment with a fixed frequency oscillator and a push-pull output, FIG. 4 is a similar view of a signal generator in accordance with a fourth embodiment with a variable frequency oscillator and a push-pull output, and FIG. 5 shows signal waveforms (illustrated as square waveforms) at various points in the circuit of FIG. 4.

Referring first to FIG. 1 of the drawings, an electrical signal generator comprises a fixed frequency oscillator 1, namely a fixed frequency digital clock which produces two square wave signal outputs with the fixed frequency, namely a first output $Q_1$ and an inverted output $\overline{Q}_1$ as will become apparent from later description. Only the first output $Q_1$ is utilized in the embodiments of FIGS. 1 and 2 and both outputs $Q_1$ and $\overline{Q}_1$ are utilized in the embodiments of FIGS. 3 and 4. In this embodiment, the voltage range of the signals $Q_1$, $\overline{Q}_1$ is −0.8 volts to −1.8 volts.

Outputs $Q_1$, $\overline{Q}_1$ are fed to a buffer 2 which is an emitter coupled logic circuit. A circuit input 15 operates through transistors 12, 11 to turn buffer 2 on and off at a very high rate to produce bursts of signals $Q_2$, $\overline{Q}_2$ from the buffer 2. In this embodiment, input 15 is 5 volts, i.e. +5 volts on and zero volts off. The collector of transistor 12 is +5 volts off and −5 volts on and the emitter of transistor 11 which is connected to the enable terminal of buffer 2 is zero volts off and −2 volts on. The collector of transistor 12 is also connected to drive transistor 10 whose collector is connected to the emitters of transistors 3, 4. The signal from transistor 10 to transistor 3, 4 is −5 volts off and −1.4 volts on. The transistors 3, 4 operate as a differential switch to amplify the power levels of signals Q2, $\overline{Q}$2. (As previously mentioned, signal $\overline{Q}_1$ is not utilized in this embodiment.)

Square wave signal pulse $Q_2$ is passed from buffer 2 to power boosting transistor 4 to produce square wave signal pulse $Q_3$ at the collector of transistor 4 which has peak voltages of +12 and −2 volts, i.e. a positive supply voltage (VCC) as a logic high and a negative supply voltage (WEE) as a logic low. Square wave signal output pulse Q3 is fed to a high slew rate operational amplifier 5 which functions as an impedance converter. The output from the collector of transistor 4 has a relatively high impedance and the output $Q_4$ from operational amplifier 5 has a relatively low impedance.

Output $Q_4$ from operational amplifier 5 is fed to a buffer transistor 6 which slightly delays the signal to facilitate crossover and minimize crossover distortion. Square wave signal pulse $Q_5$ from transistor 6, with peaks of +11.4 volts and −0.4 volts passes to power MOSFET 7 and then to a line transformer 8 or any other suitable means for impedance matching at a circuit output 16. A choke 9 acts as the load for the power MOSFET 7. A time varying voltage supply applied as VDD at terminal 17 provides amplitude modulation and average power regulation at the output 16. Other forms of modulation such as frequency, phase, pulse position or duty cycle may be effected.

A TTL or CMOS signal applied to the TTL input 15 switches transistor switches 12, 11 and 10 on and off. When the TTL input is at logic low, transistor switch 11 disables clock buffer 2. When transistor switch 11 is in the on state, clock buffer 2 outputs logic low on both outputs $Q_2$ and $\overline{Q}_2$. At the same time, transistor switch 10 is in the on state so that the differential pair transistor switch 3, 4 outputs low as well and keeps the RF power FET switch 7 in the off state. During this time, power is not dissipated in transistor switch 7. The TTL of CMOS waveform applied to TTL input 15 controls the average output RF power (as pulse-coded amplitude modulation).

During the presence of logic low at the TTL input 15, the transistor switch 10 is in the on state and the resistance of the emitters of the differential pair transistor switch 3, 4 to VEE 13 will be about half the value of that when the transistor switch 10 is in the off state. Both transistors of the differential pair transistor switch 3, 4 saturate and both outputs are logic low. In order to have both outputs from the differential pair transistor switch 3, 4 at logic low at the same time, the current limit of the differential pair transistor switch 3, 4 is doubled.

The embodiment shown in FIG. 2 is similar to that of FIG. 1 except that, in FIG. 2, digital clock 1a has a voltage controlled adjustable frequency. FIG. 3 has a fixed frequency digital clock 1 as in FIG. 1 but also utilises signal $\overline{Q}_1$. Signal $\overline{Q}_3$ from transistor 3 passes to operational amplifier 18, transistor 19 and power MOSFET 20 which are the equivalent of operational amplifier 5, transistor 6 and power MOSFET 7 used for signal $Q_3$. Power MOSFET 20 is in push-pull configuration with power MOSFET 7 and the outputs thereof are fed to push-pull transformer 8. The circuit of FIG. 3 is therefore capable of producing higher power than the circuits of FIGS. 1 and 2.

FIG. 4 is similar to FIG. 3 except that a variable frequency digital clock 1a is used instead of the fixed frequency digital clock 1.

Ancillary components of the generator circuits described are shown in FIGS. 1 to 4 and their function will be readily apparent to a person skilled in the art. Accordingly, it is not believed necessary to refer to such components in any greater detail.

FIG. 5 shows waveforms at various points in the circuit of FIG. 4. Waveform (a) is the waveform at the collector of transistor 12, waveform (b) is the waveform at the emitter of transistor 11 and waveform (c) is the waveform at the collector of transistor 10.

It will be readily apparent to a person skilled in the art that the invention is especially useful for regulating an RF excited laser.

Other embodiments will also be readily apparent to a person skilled in the art, the scope of the invention being defined in the appended claims.

We claim:

1. An electrical signal generator for generating an output signal of predetermined frequency comprising:

an oscillator of predetermined frequency operable to produce a first signal of said frequency, amplifying means for receiving and amplifying the power level of said first signal to produce a first higher power signal, and means for both switching on and off the feed of said first signal from the oscillator to the amplifying means and controlling the amplifying means, and means for feeding said first higher power signal to an output, said oscillator producing a first signal and an inverted first signal, said amplifying means receiving and amplifying the first signal and the inverted first signal, and said feeding means feeding both the first higher power signal and the inverted first higher power signal to the output.

2. A generator according to claim 1 wherein the oscillator comprises a digital clock.

3. A generator according to claim 2 wherein the digital clock has a fixed frequency.

4. A generator according to claim 2 wherein the digital clock has a voltage controlled adjustable frequency.

5. A generator according to claim 1 wherein the feeding means comprises a buffer which receives the higher power first signal from the amplifying means and provides an output signal of lower impedance.

6. A generator according to claim 1 wherein the feeding means comprises means to delay signal crossover to reduce likelihood of crossover distortion.

7. A generator according to claim 1 wherein the feeding means comprises a voltage-controlled power adjuster.

* * * * *